(12) United States Patent
Imasaka

(10) Patent No.: US 9,932,882 B2
(45) Date of Patent: Apr. 3, 2018

(54) VALVE DEVICE AND HYDRAULIC CONTROL SYSTEM

(71) Applicant: DENSO CORPORATION, Kariya, Aichi-pref. (JP)

(72) Inventor: Yusuke Imasaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 114 days.

(21) Appl. No.: 15/174,096

(22) Filed: Jun. 6, 2016

(65) Prior Publication Data

US 2016/0363036 A1 Dec. 15, 2016

(30) Foreign Application Priority Data

Jun. 11, 2015 (JP) .................................. 2015-118536

(51) Int. Cl.
*F01P 7/16* (2006.01)
*F01P 7/14* (2006.01)
*F16K 11/085* (2006.01)

(52) U.S. Cl.
CPC ........... *F01P 7/16* (2013.01); *F01P 2007/146* (2013.01); *F16K 11/0856* (2013.01); *Y10T 137/86863* (2015.04)

(58) Field of Classification Search
CPC ................... F01P 7/16; F01P 2007/146; Y10T 137/86863; Y10T 137/86509; Y10T 137/86517; Y10T 137/86533; Y10T 137/8782
USPC ............. 123/41.08, 41.09, 41.1; 137/625.12, 137/625.13, 625.15, 625.46, 876
See application file for complete search history.

(56) References Cited

U.S. PATENT DOCUMENTS

| | | | | |
|---|---|---|---|---|
| 6,681,805 B2* | 1/2004 | McLane | ............. | B60H 1/00485 137/625.16 |
| 7,165,513 B2* | 1/2007 | Humburg | ........... | B60H 1/00485 123/41.08 |
| 2015/0361865 A1* | 12/2015 | Lee | ........................... | F01P 7/14 123/41.08 |

FOREIGN PATENT DOCUMENTS

| | | |
|---|---|---|
| JP | 2002-327851 | 11/2002 |
| JP | 2013-194716 | 9/2013 |
| JP | 2013-238200 | 11/2013 |

* cited by examiner

*Primary Examiner* — Michael R Reid
(74) *Attorney, Agent, or Firm* — Nixon & Vanderhye P.C.

(57) ABSTRACT

A first valve portion and a second valve portion are formed in a rotary valve, wherein the first and the second valve portions are arranged in an axial direction thereof. The first valve portion includes a first and a second valve windows formed in a valve member, and a first and a second valve port openings formed in a valve housing. The second valve portion includes a third valve window formed in the valve member and a third valve port opening formed in the valve housing. The valve member is rotatable in both directions of a clockwise direction and an anti-clockwise direction, so that each of the first to the third valve port openings is respectively opened or closed by the first to third valve windows. Each of the valve windows and the valve port openings of the first valve portion is formed in a rectangular shape in its developed figure in a rotational direction of the valve member.

11 Claims, 7 Drawing Sheets

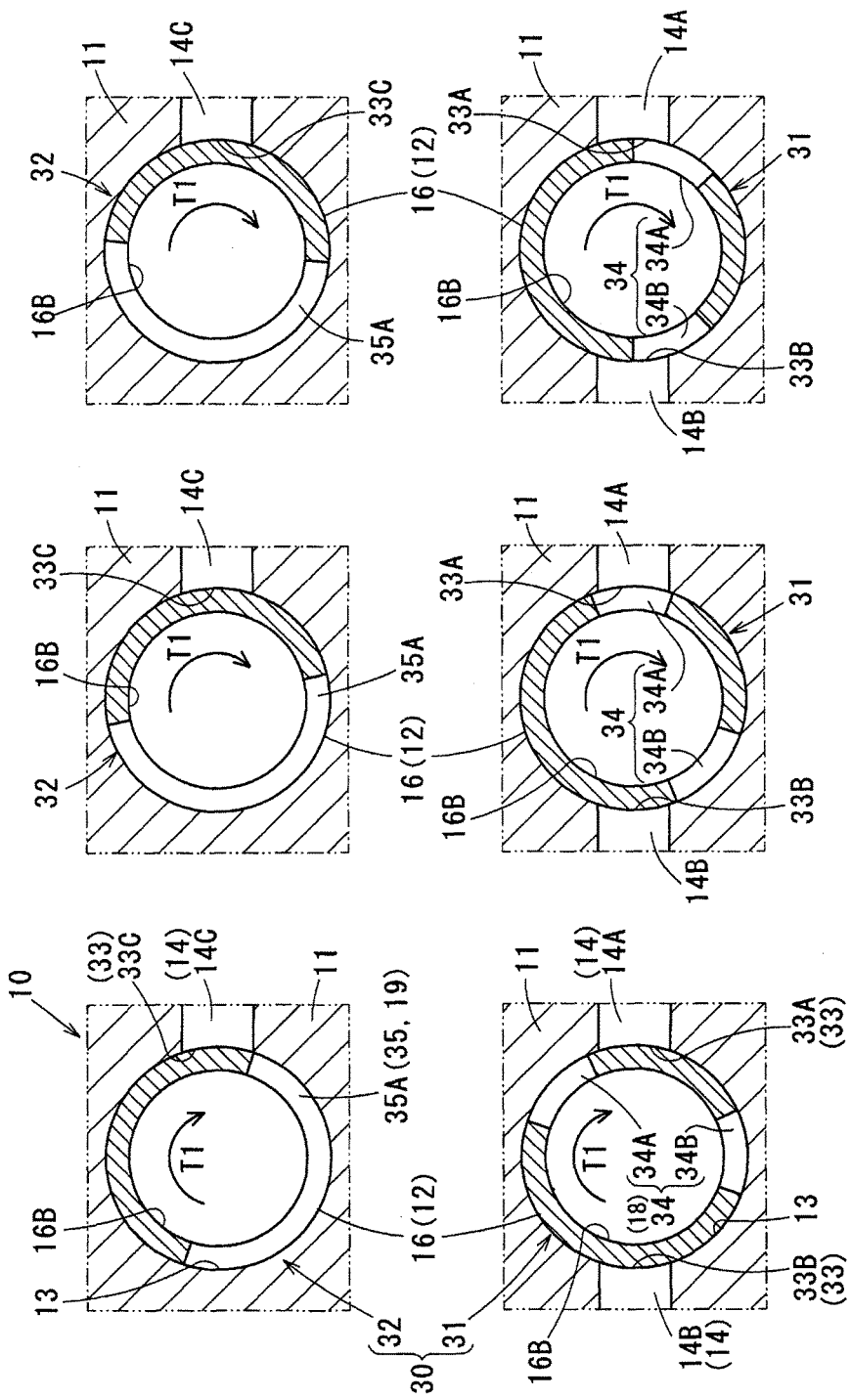

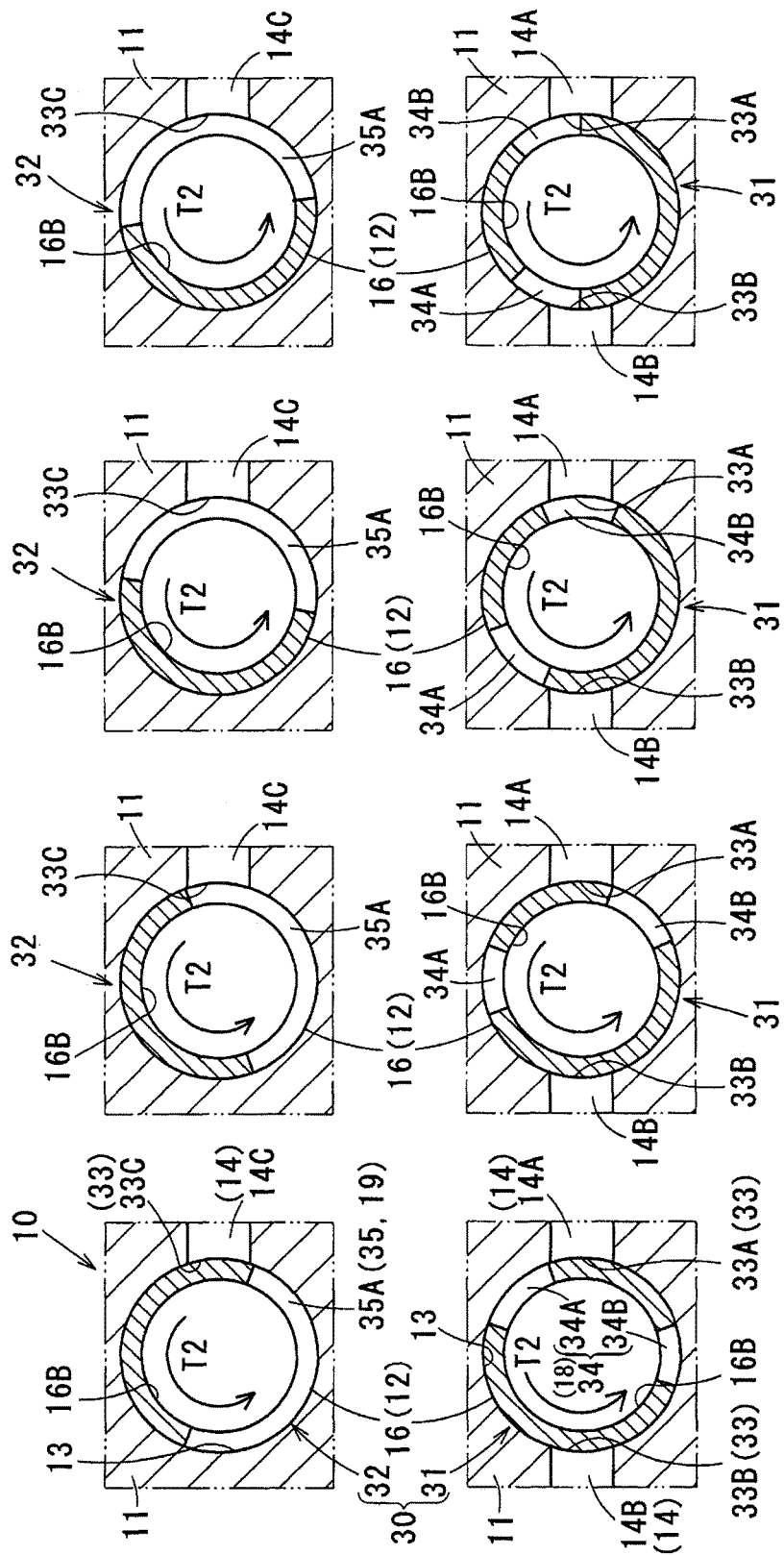

VALVE DEVICE AND HYDRAULIC CONTROL SYSTEM

CROSS REFERENCE TO RELATED APPLICATION

This application is based on Japanese Patent Application No. 2015-118536 filed on Jun. 11, 2015, the disclosure of which is incorporated herein by reference.

FIELD OF TECHNOLOGY

The present disclosure relates to a valve device arranged in a fluid passage for opening and closing the fluid passage, and in particular, relates to a valve device which is composed of a rotary type valve for opening and closing multiple fluid passages and a hydraulic control system having the valve device.

BACKGROUND

A valve device, which is composed of a rotary type valve, is known in the art and practically used, for example, as disclosed in Japanese Patent Publication No. 2002-327851.

A rotary type valve having the following structure is generally used in the valve device. The rotary type valve is composed of a valve housing having multiple fluid ports and a cylindrical valve member movably accommodated in the valve housing for respectively opening and closing the fluid ports. In the above rotary type valve, the valve member is rotated so as to increase or decrease an opening area (or a fluid flow passage area), which is formed by a fluid port of the valve member (a valve-side fluid port) and a fluid port of the valve housing (a housing-side fluid port).

A cooling fluid control system is installed in an automotive vehicle, which is propelled by an internal combustion engine (hereinafter, the engine), wherein multiple fluid passages are provided for the purpose of effectively using cooling water of the engine. A valve device having a rotary type valve is incorporated into the cooling fluid control system so as to open and close each of the multiple fluid passages. The valve device is composed of a complex type valve device, which has multiple rotary type valves and multiple actuators, each of which is attached to the respective rotary type valve for properly operating the rotary type valve in order to achieve a variety of valve operation modes.

In recent years, a number of equipment, in particular, a number of devices to be mounted in an engine room of the vehicle is increased in accordance with developments of the vehicle, in order to meet various kinds of requirements in view of improving engine performance, occupant comfort and so on. It is, therefore, strictly required for those equipment and devices to realize reduction in size and weight. Accordingly, it becomes more and more difficult that the valve device having the above complex structure is smoothly mounted in the engine room. It is, therefore, necessary to realize the reduction in size and weight for the valve device.

A valve device having a multi-stage structure is proposed in the art as one of countermeasures for reducing the size and the weight of the valve device. In the multi-stage structure, multiple valve portions of a rotary type are arranged in an axial direction of a valve member in order that one actuator for rotating the valve member is commonly used for each of the multiple valve portions. In other words, a valve device, which has one valve member of the rotary type and one actuator for driving the valve member, is proposed. However, such a valve device is not sufficiently reduced in the size and the weight. Therefore, it is necessary for the valve device to further improve the reduction of the size and the weight.

According to the study of the inventor of the present disclosure, there are still following problems in the above valve device having the multiple-stage structure, so long as a basic structure of the rotary type valve device is continuously used:

(1) In the rotary type valve device, the valve member of the cylindrical shape is rotated so as to increase or decrease the opening area of the fluid port. When the valve member is simply made longer in its axial direction and the multiple valve portions are arranged in the axial direction so as to provide the multi-stage valve structure, an outer shape of the valve device inevitably becomes larger. In addition, it is correspondingly necessary to provide a larger actuator in order to rotate the valve member of the rotary type, the outer shape of which has become larger.

(2) In the rotary type valve device, it is necessary to carry out a desired multi-stage opening-closing control during the valve member of the cylindrical shape is rotated by one rotation (360°). Therefore, an effective rotational angle is restricted in each of the valve portions formed in each of the multiple stages, depending on a number of the multiple stages. It becomes necessary to form a larger fluid port in each of the valve portions when a desired amount of the flow rate is obtained in the restricted rotational angle. In other words, it is necessary to provide a larger valve member and a larger valve housing in order to sufficiently obtain a fluid flow area by enlarging the fluid port. As a result, the valve device may become larger as a whole.

(3) According to the above prior art (JP 2002-327851), the fluid port is formed in an oval shape, wherein a length of the oval shape in a rotational axis direction of the valve member is made to be longer than a length in a direction perpendicular to the rotational axis direction. However, it is not sufficient for the valve device of the above prior art to satisfy requirements for reduction in the size and the weight.

(4) The inventor of the present disclosure further investigated the shape of the fluid ports, an arrangement of the fluid passages in the multi-stage structure and so on, in order to make dimensions of the valve device smaller in the axial direction and in the radial direction. In other words, the inventor worked in research and development in order to make smaller the size and the weight of the valve device, without largely changing the basic mechanism of the rotary type valve device.

SUMMARY OF THE DISCLOSURE

The present disclosure is made in view of the above problem. It is an object of the present disclosure to provide a valve device, for which reduction in size and weight can be realized without changing a basic mechanism of a rotary type valve. According to the valve device of the present disclosure, it is possible to open and close multiple fluid passages, while a size in a radial direction as well as a size in an axial direction is made smaller and a structure is made simpler.

According to one of features of the present disclosure, a valve device comprises a rotary valve and an actuator connected to the rotary valve for operating a rotation of the rotary valve. The rotary valve includes:

a valve housing having a valve accommodation portion of a cylindrical shape, a fluid inlet port and multiple fluid outlet ports, each of the fluid outlet ports being formed in the valve housing in a radial direction of the valve accommodation portion and respectively connected to different fluid devices;

a valve member rotatably accommodated in the valve accommodation portion and having a cylindrical body portion for controlling an opening or closing of each fluid outlet ports;

an open end portion formed in the cylindrical body portion of the valve member at an axial end of the cylindrical body portion and communicated to the fluid inlet port of the valve housing, so that working fluid is supplied into an inside of the cylindrical body portion of the valve member; and a first valve portion and a second valve portion formed in the rotary valve and arranged in an axial direction of the valve member, each of the first and the second valve portions being formed as a valve portion for opening or closing a fluid communication between the fluid inlet port and each of the fluid outlet ports.

According to one of the characterizing features of the present disclosure, the first valve portion is composed of:

a first valve port opening formed in the valve housing at an inner peripheral wall of the valve accommodation portion, the first valve port opening being formed as an inside open end of a first fluid outlet port of the multiple fluid outlet ports;

a second valve port opening formed in the valve housing at the inner peripheral wall of the valve accommodation portion, the second valve port opening being formed as an inside open end of a second fluid outlet port of the multiple fluid outlet ports; and a first stage valve window formed in the valve member so as to pass through the cylindrical body portion in the radial direction, the first stage valve window respectively opening or closing each of the first valve port opening and the second valve port opening, wherein each of the first valve port opening, the second valve port opening and the first stage valve window of the first valve portion is formed in a rectangular shape in its developed figure in a rational direction of the valve member.

According to the above feature, an increase of an opening area of the first stage valve window with respect to the first or the second valve port opening is constant for a unit rotational angle of the valve member. Since it is possible to obtain a larger opening area (a larger fluid flow amount) with a smaller rotational angle, it is possible to effectively use one rotation (360°) of the valve member in order to control the opening and closing of different fluid passages. In other words, it is possible to reduce the dimension of the valve device in the radial direction.

According to another feature of the present disclosure, a valve opening starting point of the first valve portion in the rotation of the valve member in a clockwise direction and a valve opening starting point of the second valve portion in the rotation of the valve member in an anti-clockwise direction are separated from each other in a circumferential direction of the valve member.

According to the arrangement of the fluid outlet ports of the multi-stage structure, two fluid outlet ports are controlled by the valve member to be opened or closed in the first valve portion, while another fluid outlet port is independently controlled by the valve member to be opened or closed in the second valve portion.

According to the above structure, it is possible to provide the arrangement of the fluid outlet ports, wherein a height of the valve housing in the axial direction is compressed. In other words, it is possible to control the opening and the closing of the multiple fluid outlet ports, while the dimension of the valve device is made smaller in the axial direction.

Accordingly, it is possible in the present disclosure to provide the rotary type valve device, the dimensions of which can be made smaller in its axial direction and its radial direction. In other words, it is possible to provide the valve device, which is simple in its structure but capable of controlling the opening and closing of the multiple fluid outlet ports, without changing the basic mechanism of the rotary type valve device.

BRIEF DESCRIPTION OF THE DRAWINGS

The above and other objects, features and advantages of the present disclosure will become more apparent from the following detailed description made with reference to the accompanying drawings. In the drawings:

FIGS. 4A-1, 4A-2, 4B-1, 4B-2, 4C-1 and 4C-2 are schematic cross sectional views showing valve opening and valve closing conditions of the valve member, when it is rotated in a clockwise direction, wherein each of FIGS. 4A-1, 4B-1 and 4C-1 shows a condition of an upper-side valve portion of the rotary type valve, while each of FIGS. 4A-2, 4B-2 and 4C-2 shows a condition of a lower-side valve portion of the rotary type valve;

FIGS. 5A-1, 5A-2, 5B-1, 5B-2, 5C-1, 5C-2, 5D-1 and 5D-2 are schematic cross sectional views showing valve opening and valve closing conditions of the valve member, when it is rotated in an anti-clockwise direction, wherein each of FIGS. 5A-1, 5B-1, 5C-1 and 5D-1 shows a condition of the upper-side valve portion of the rotary type valve, while each of FIGS. 5A-2, 5B-2, 5C-2 and 5D-2 shows a condition of the lower-side valve portion of the rotary type valve;

DETAILED DESCRIPTION OF THE EMBODIMENTS

Figure 1:
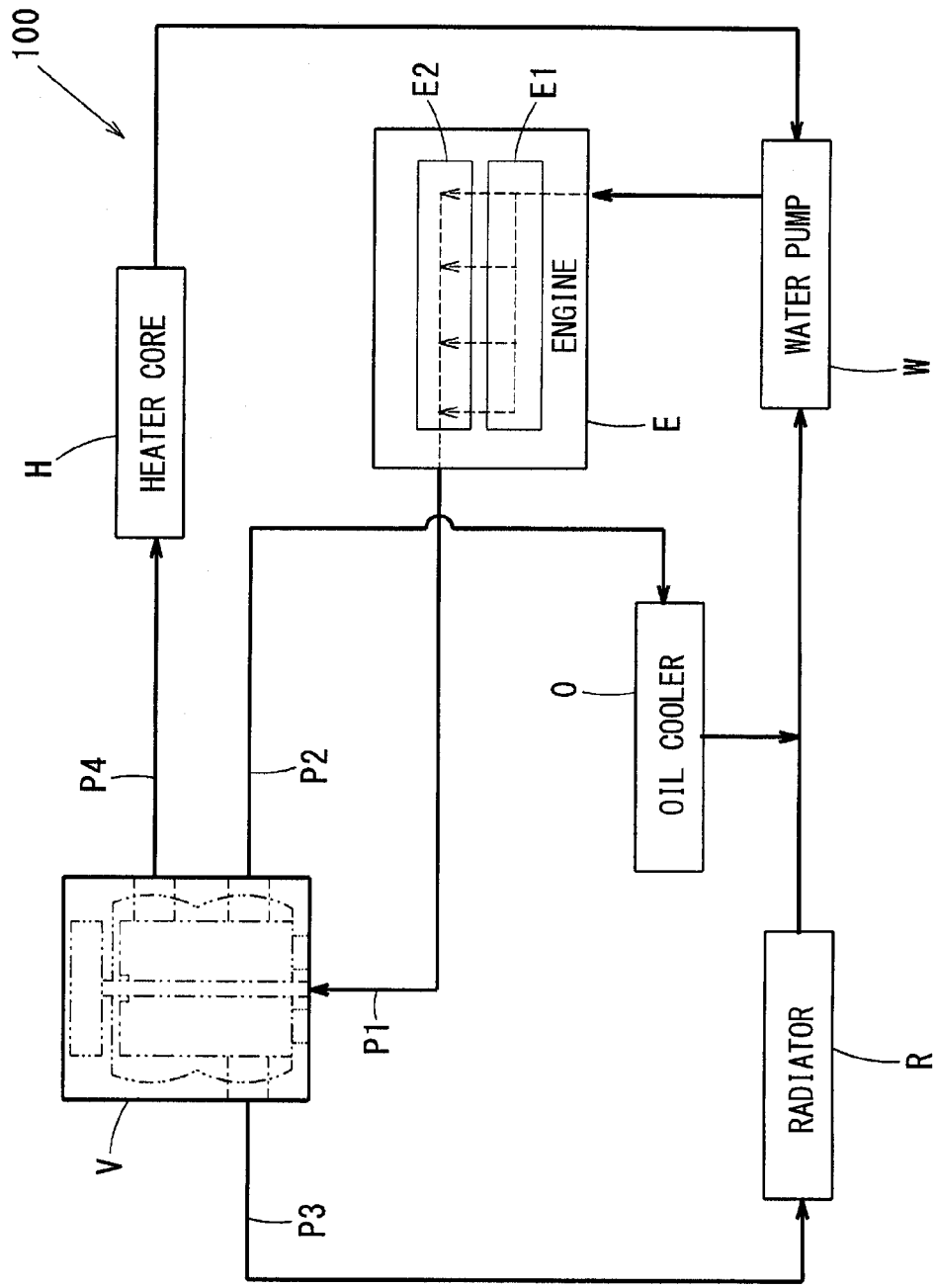
FIG. 1 is a block diagram showing an entire structure of a hydraulic control system, for example, a cooling system for an internal combustion engine of a vehicle, in which a valve device of the present disclosure is incorporated.

The present disclosure will be explained hereinafter by way of an embodiment with reference to the drawings. However, the present disclosure is not limited to the embodiment.

A valve device V and a hydraulic control system 100 of the embodiment of the present disclosure are applied to, for example, a cooling system 100 for an internal combustion engine E (hereinafter, the engine) of a vehicle.

An entire structure of the cooling system 100 for the engine E will be explained with reference to FIG. 1.

In the cooling system 100 for the engine E, a controlled object is engine cooling water (hereinafter, the cooling water) for cooling the engine E. Components included in the cooling system 100 are a water pump W, an oil cooler O, a radiator R and a heater core H. Those components are connected to one another via multiple fluid passages P1 to P4. The valve device V is provided in order to open and/or close those fluid passages P1 to P4.

The water pump W, which is composed of a well-known electrical pump, supplies the cooling water to the engine E in order to cool a cylinder block E1 and a cylinder head E2. The water pump W also works as a driving source for supplying the cooling water to the above components O, R and H, so that the cooling water is circulated via the fluid passages P1 to P4.

The oil cooler O is a heat exchanger for exchanging heat of engine lubricating oil with the cooling water. The radiator R is a heat exchanger for cooling the cooling water. The heater core H is a heat exchanger for heating air to be supplied into a passenger compartment of the vehicle by use of heat of the cooling water.

The valve device V is arranged among the fluid passages P1 to P4 in order to control supply of the cooling water to each of the components O, R and H.

The fluid passage P1 is a fluid passage for supplying the cooling water from the engine E to the valve device V. The fluid passage P2 is a fluid passage for supplying the cooling water from the valve device V to the oil cooler O. The fluid passage P3 is a fluid passage for supplying the cooling water from the valve device V to the radiator R. The fluid passage P4 is a fluid passage for supplying the cooling water from the valve device V to the heater core H. Hereinafter, the fluid passages P1 to P4 are respectively referred to as a first fluid passage P1, a second fluid passage P2, a third fluid passage P3 and a fourth fluid passage P4.

(Basic Structure of Valve Device)

A basic structure of the valve device V will be explained with reference to FIG. 2 and FIGS. 4A-1 and 4A-2.

In the present disclosure, an upper side in the drawings (FIG. 2 and FIGS. 3A to 3C) is also referred to as "an upper stage" or "a second stage", while a lower side in the drawings is also referred to as "a lower stage" or "a first stage". However, in an actual use of the valve device, which is mounted in an engine room, "the upper side" and "the lower side" do not always correspond to an upper position and a lower position in a vertical direction.

The valve device V is composed of a rotary type valve 10 having a multi-stage structure and an actuator 20 for rotating the rotary type valve 10 (hereinafter, the rotary valve 10).

The rotary valve 10 of the multi-stage structure has a valve housing 11 and a valve member 12, as main components thereof. The rotary valve 10 has a valve portion 30, which is formed inside of the rotary valve 10.

The valve housing 11, which forms an outer frame of the rotary valve 10, has a valve accommodation portion 13 formed in an almost cylindrical shape and multiple fluid outlet ports 14, each of which is arranged at a radial-outside position of the valve accommodation portion 13. The cooling water (working fluid) is supplied to different devices (the components O, R, H) from the respective fluid outlet ports 14.

The fluid outlet ports 14 include a first fluid outlet port 14A, a second fluid outlet port 14B and a third fluid outlet port 14C, each of which is respectively connected to the second fluid passage P2, the third fluid passage P3 and the fourth fluid passage P4. The first and the second fluid outlet ports 14A and 14B are arranged in the lower side (the first stage) of the rotary valve 10, while the third fluid outlet port 14C is arranged at the upper side (the second stage) of the rotary valve 10.

A fluid inlet port 15, which is connected to the first fluid passage P1, is formed in the valve housing 11 in order to supply the cooling water into the inside of the rotary valve 10.

The valve member 12, which is rotatably accommodated in the valve accommodation portion 13 of the valve housing 11, opens or closes each of the fluid outlet ports 14 (14A to 14C). The valve member 12, which is formed in an almost cylindrical shape as a whole, has a cylindrical body portion 16 and a rotating shaft 17. The valve member 12 is rotatably supported in the valve housing 11 by the rotating shaft 17.

The cylindrical body portion 16, which has a closed end portion 16A at the upper side and an open end portion 16B at the lower side, is formed in a cup shape (a reversed U shape in its cross section). The closed end portion 16A of the cylindrical body portion 16 is supported by the rotating shaft 17. The open end portion 16B of the lower side is communicated to the fluid inlet port 15 of the valve housing 11, so that the cooling water is supplied into an inside of the cylindrical body portion 16 (that is, the inside of the rotary valve 10).

As explained below, a lower-side valve body opening 18 and an upper-side valve body opening 19 are formed in the cylindrical body portion 16.

The valve portion 30 is composed of a first valve portion 31 and a second valve portion 32, each of which controls a communication condition (an opening or closing condition) between the fluid inlet port 15 (the open end portion 16B of the cylindrical body portion 16) and each of the fluid outlet ports 14 (14A to 14C) of the valve housing 11.

Figure 3A:
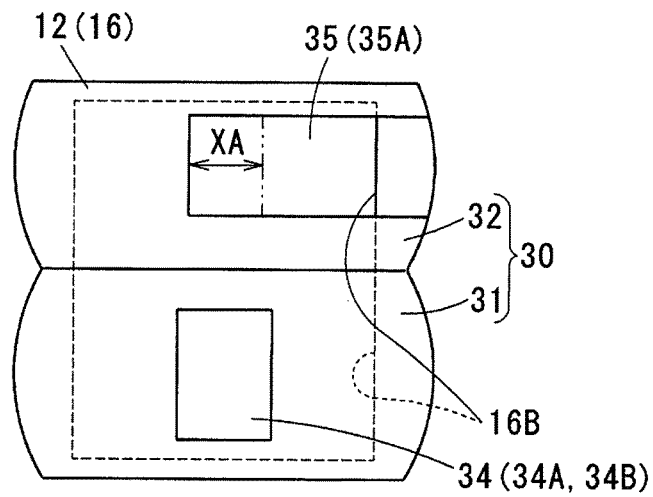
FIG. 3A is a schematic external view of a valve member of a rotary type valve showing configurations of fluid ports, more exactly, valve windows formed in the valve member.
Figure 3B:
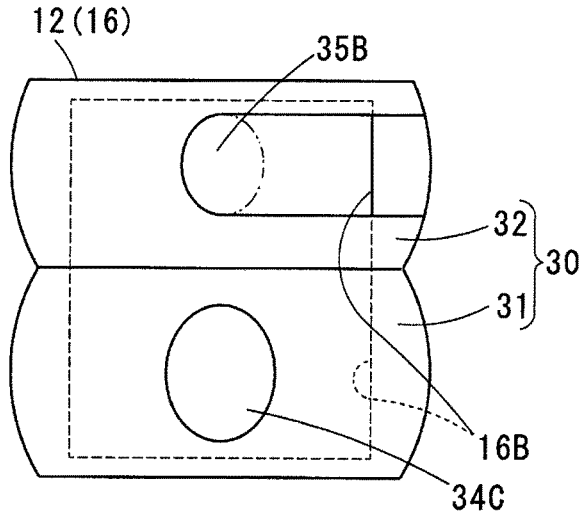
FIGS. 3B and 3C are schematic external views of valve members according to comparison examples, each showing configurations of the fluid ports, which are different from those of FIG. 3A.
Figure 3C:
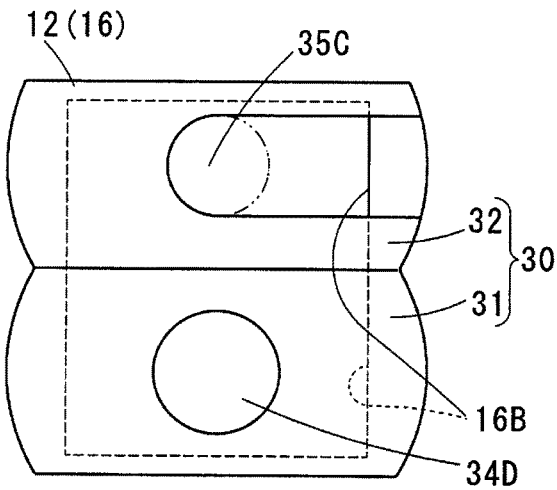

As shown in FIGS. 3A to 3C, each of the first and the second valve portions 31 and 32 has an outer surface outwardly projected in an arc-like curved shape, which is in contact with an inner peripheral surface of the valve accommodation portion 13 of the valve housing 11 in a sliding manner so as to form a ball-valve structure.

The first and the second valve portions 31 and 32 are arranged in an axial direction of the rotary valve 10 in a two-stage structure. The first valve portion 31 is located at the lower side (the first stage), while the second valve portion 32 is located at the upper side (the second stage).

The first valve portion 31 of the lower side opens and/or closes two of the fluid outlet ports 14, that is, the first fluid outlet port 14A and the second fluid outlet port 14B. The first valve portion 31 has a first stage valve window 34 on a side of the valve member 12, which opens and/or closes a first valve port opening 33A and a second valve port opening 33B of the valve housing 11.

Each of the first and the second valve port openings 33A and 33B is formed at the inner peripheral surface of the valve accommodation portion 13 of the valve housing 11. The first valve port opening 33A is formed at an inside end of the first fluid outlet port 14A, while the second valve port opening 33B is formed at an inside end of the second fluid outlet port 14B. The first and the second valve port openings 33A and 33B are arranged at such positions opposed to each other across the valve member 12 (the cylindrical body portion 16 of the valve member 12) in a radial direction of the rotary valve 10, as shown in FIG. 4A-2.

The first stage valve window 34, which corresponds to the lower-side valve body opening 18, is composed of a first valve window 34A and a second valve window 34B, each of which passes through the cylindrical body portion 16 of the valve member 12 in the radial direction. In addition, each of the first and the second valve windows 34A and 34B extends in a circumferential direction of the cylindrical body portion 16. In other words, each of the first and the second valve windows 34A and 34B has a predetermined length in the circumferential direction.

Figure 2:
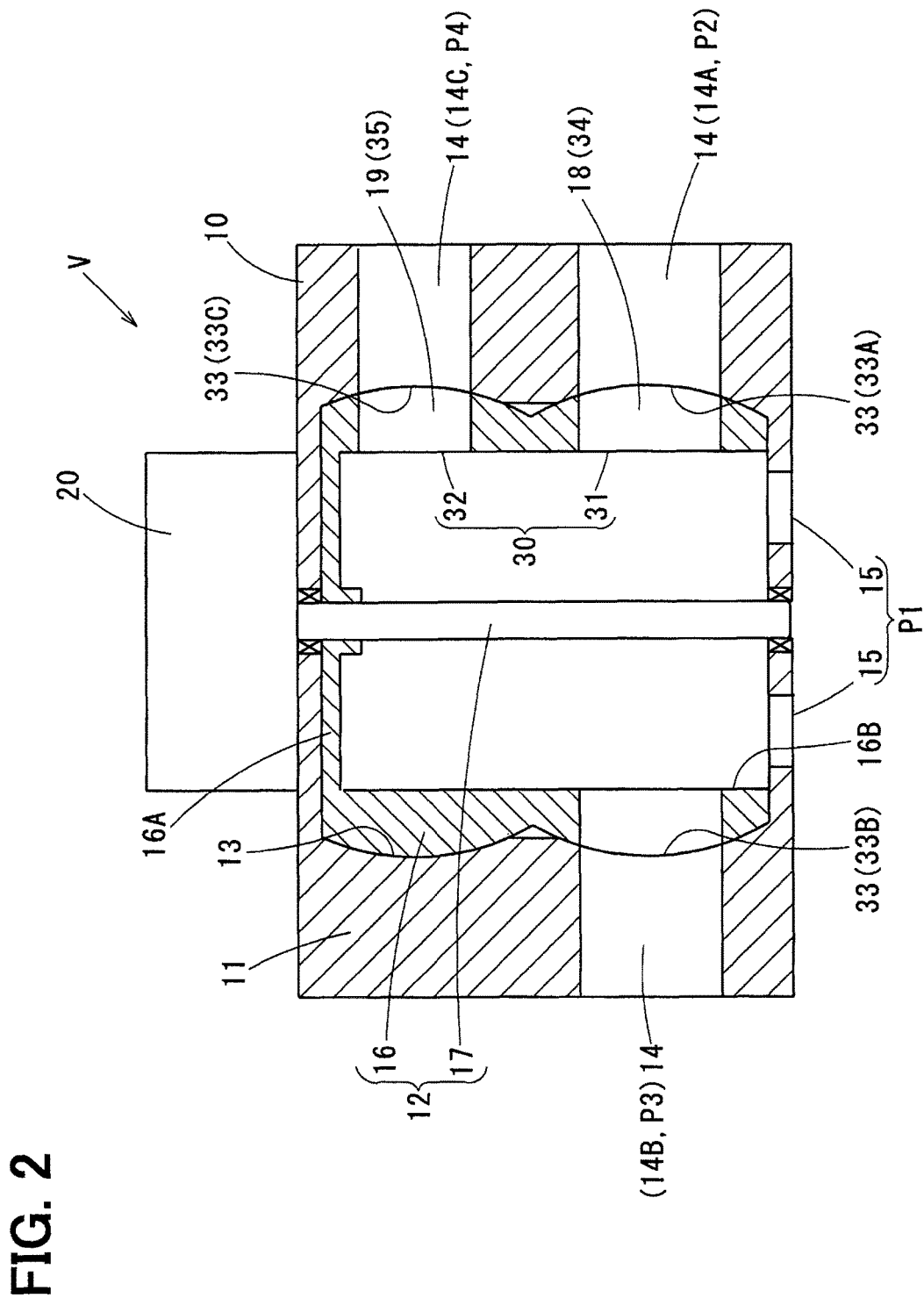
FIG. 2 is a schematic cross sectional view showing the valve device according to an embodiment of the present disclosure.

The first and the second valve windows 34A and 34B are formed in the cylindrical body portion 16 at such positions separated from each other in the circumferential direction, as shown in FIG. 4A-2. Each of the first and the second valve windows 34A and 34B respectively opens or closes the first and the second valve port openings 33A and 33B when the valve member 12 is rotated with respect to the valve housing 11.

The second valve portion 32 of the upper side opens and/or closes one fluid outlet port 14, that is, the third fluid outlet port 14C. The second valve portion 32 has a second stage valve window 35 on the side of the valve member 12, which opens and/or closes a third valve port opening 33C of the valve housing 11.

The third valve port opening 33C is formed at the inner peripheral surface of the valve accommodation portion 13 of the valve housing 11. The third valve port opening 33C is formed at an inside end of the third fluid outlet port 14C.

The second stage valve window 35, which corresponds to the upper-side valve body opening 19, is composed of a third valve window 35A and passes through the cylindrical body portion 16 of the valve member 12 in the radial direction. In addition, the third valve window 35A extends in the circumferential direction of the cylindrical body portion 16. The third valve window 35A has an open angle larger than that of the first and the second valve windows 34A and 34B.

As above, the valve portion 30 has multiple valve windows 34A, 34B, 35A and multiple valve port openings 33A, 33B and 33C. More exactly, the first valve portion 31 has the first and the second valve windows 34A and 34B on the side of the valve member 12 as well as the first and the second valve port openings 33A and 33B on the side of the valve housing 11. The second valve portion 32 has the third valve window 35A on the side of the valve member 12 and the third valve port opening 33C on the side of the valve housing 11. Each of the valve windows 34A, 34B and 35A as well as each of the valve port openings 33A to 33C is formed in a rectangular shape in its developed figure when it is developed in its rotational direction of the valve member 12.

A more detailed configuration of the valve windows on the side of the valve member 12 will be explained below as representative examples.

The actuator 20 receives a command signal from a controller (not shown), for example, an electronic control unit (ECU) incorporated into an electronic control device for controlling an operation of the vehicle. The actuator 20 is connected to the rotating shaft 17 and rotates the valve member 12 of the rotary valve 10 either in a clockwise direction or in an anti-clockwise direction.

The actuator 20 is composed of a generally well-known driving mechanism, which has, for example, an electric motor rotatable in both of a forward and a backward directions and a reduction gear device for reducing rotational speed of the electric motor and transmitting the rotation of the electric motor to the rotating shaft 17.

(Basic Operation of Valve Device)

A basic operation of the above explained valve device V will be explained.

There are two operational modes related to the cooling water for the engine E of the vehicle, that is, a first operational mode in which the heater core H is not used and a second operational mode in which the heater core H is used in a cold climate. The cooling system 100 controls the cooling water for the engine E depending on an operational condition of the vehicle.

(First Operational Mode)

In the first operational mode, the first fluid passage P1 is connected to the second fluid passage P2 and the third fluid passage P3, so that the cooling water of the engine E is supplied by the water pump W to the oil cooler O and the radiator R. At the same time, the communication between the first fluid passage P1 and the fourth fluid passage P4 is blocked out in order not to supply the cooling water to the heater core H.

For the above purpose, the first valve portion 31 opens the first fluid outlet port 14A and the second fluid outlet port 14B, while the second valve portion 32 closes the third fluid outlet port 14C.

More exactly, in the first valve portion 31, the first stage valve window 34 of the valve member 12 (that is, each of the first and the second valve windows 34A and 34B) respectively overlaps with the first valve port opening 33A and the second valve port opening 33B formed in the valve housing 11 in such a manner that an opening area formed between each valve window 34A/34B and each valve port opening 33A/33B is changed. As a result, the cooling water introduced into the inside of the cylindrical body portion 16 from the open end portion 16B is respectively supplied to the oil cooler O and the radiator R. On the other hand, in the second valve portion 32, the second stage valve window 35 (the third valve window 35A) of the valve member 12 does not overlap with the third valve port opening 33C of the valve housing 11. Therefore, the cooling water introduced into the inside of the cylindrical body portion 16 is not supplied to the heater core H.

(Second Operational Mode)

In the second operational mode, the first fluid passage P1 is connected to all of the second to the fourth fluid passages P2 to P4, so that the cooling water of the engine E is supplied by the water pump W to not only the oil cooler O and the radiator R but also the heater core H.

For the above purpose, the first valve portion 31 opens the first fluid outlet port 14A and the second fluid outlet port 14B so as to control a flow rate of the cooling water flowing through each of the first and the second fluid outlet ports 14A and 14B, while the second valve portion 32 also opens the third fluid outlet port 14C so as to control a flow rate of the cooling water flowing through the third fluid outlet port 14C.

More exactly, in the first valve portion 31, the first stage valve window 34 of the valve member 12 (the first and the second valve windows 34A and 34B) respectively changes the opening area formed between each valve window 34A/34B and each valve port opening 33A/33B, so that the cooling water introduced into the inside of the cylindrical body portion 16 from the open end portion 16B is respectively supplied to the oil cooler O and the radiator R. At the same time, in the second valve portion 32, the second stage valve window 35 (the third valve window 35A) of the valve member 12 overlaps with the third valve port opening 33C of the valve housing 11 so as to change an opening area formed between the third valve window 35A and the third valve port opening 33C. As a result, the cooling water introduced into the inside of the cylindrical body portion 16 is also supplied to the heater core H.

(First Characterizing Point)

A structure of the valve portion 30 will be further explained with reference to FIGS. 4A-1 to 4C-2 (collectively referred to as FIG. 4) and FIGS. 5A-1 to 5D-2 (collectively referred to as FIG. 5).

As shown in FIGS. 4 and 5, the valve member 12 is rotated in the clockwise direction indicated by an arrow T1 (FIG. 4) in the first operational mode, while the valve member 12 is rotated in the anti-clockwise direction indicated by an arrow T2 (FIG. 5) in the second operational mode.

Therefore, it is necessary that the first valve portion 31 controls the opening and the closing of the second fluid passage P2 connected to the oil cooler O and the third fluid passage P3 connected to the radiator R, while the second valve portion 32 closes the fourth fluid passage P4 connected to the heater core H, when the valve member 12 is rotated in the clockwise direction T1 in the first operational mode. On the other hand, it is necessary that the first valve portion 31 likewise controls the opening and closing of the second fluid passage P2 connected to the oil cooler O and the third fluid passage P3 connected to the radiator R, while the second valve portion 32 controls the opening and closing of the fourth fluid passage P4 connected to the heater core H, when the valve member 12 is rotated in the anti-clockwise direction T2 in the second operational mode. In other words, the first valve portion 31 controls the opening and closing of the second and the third fluid passages P2 and P3 when the valve member 12 is rotated either in the clockwise direction T1 or in the anti-clockwise direction T2. On the other hand, the second valve portion 32 controls the opening and closing of the fourth fluid passage P4 connected to the heater core H only when the valve member 12 is rotated in the anti-clockwise direction T2.

Therefore, in the first valve portion 31, the first valve window 34A and the second valve window 34B are formed in the cylindrical body portion 16 of the valve member 12 so that the first and the second valve windows 34A and 34B are separated from each other in the circumferential direction of the cylindrical body portion 16.

As shown in FIG. 4C-2, the first valve window 34A overlaps with the first valve port opening 33A of the valve housing 11, while the second valve window 34B overlaps with the second valve port opening 33B of the valve housing 11, in the first operational mode. As shown in FIG. 5D-2, the first valve window 34A overlaps with the second valve port opening 33B, while the second valve opening 34B overlaps with the first valve port opening 33A, in the second operational mode. As above, each of the valve windows 34A and 34B overlaps with the respective valve port opening 33A/33B by the rotation of the valve member 12 in the clockwise direction during the first operational mode, while each of the valve windows 34A and 34B respectively overlaps with the valve port opening 33A/33B (which is different from that of the first operational mode) by the rotation of the valve member 12 in the anti-clockwise direction during the second operational mode.

In the second valve portion 32, the third valve window 35A having an elongate hole is formed in the cylindrical body portion 16 of the valve member 12. As shown in FIGS. 4A-1, 4B-1 and 4C-1, the third valve window 35A does not overlap with the third valve port opening 33C of the valve housing 11, when the valve member 12 is rotated in the clockwise direction T1 during the first operational mode. However, as shown in FIGS. 5B-1, 5C-1 and 5D-1, the third valve window 35A overlaps with the third valve port opening 33C for a longer period only when the valve member 12 is rotated in the anti-clockwise direction T2 during the second operational mode. As shown in FIGS. 4A-1 to 4C-1 or FIGS. 5A-1 to 5D-1, the third valve window 35A has a wide rotational angular range (for example, 180 degrees) in the circumferential direction, so that a full-open valve condition for the fourth fluid passage P4 connected to the heater core H can be maintained in the second valve portion 32 for the longer period when the valve member 12 is rotated in the anti-clockwise direction T2.

According to the above-explained valve structure (the two-stage structure), the following control functions can be obtained in each of the operational modes.

As explained above, the valve member 12 of the rotary valve 10 is rotated in the clockwise direction T1 in the first operational mode. The first and the second valve portions 31 and 32 are operated as shown in FIG. 4. Each of FIGS. 4A-1 and 4A-2 shows a valve closed condition for the first valve portion 31 and the second valve portion 32. Each of FIGS. 4B-1 and 4B-2 shows a first valve opened condition, while each of FIGS. 4C-1 and 4C-2 shows a second valve opened condition.

An operation of the first valve portion 31 will be further explained. When the rotating member 12 is rotated from its valve closed position of FIGS. 4A-1 and 4A-2 in the clockwise direction Ti, the first valve window 34A of the valve member 12 starts its overlapping operation with the first valve port opening 33A of the valve housing 11 and its overlapping condition is moved to a fully-overlapped condition as shown in FIG. 4B-2 (the first valve opened condition). As a result, the second fluid passage P2 connected to the oil cooler O is fully opened.

After the first valve window 34A reaches its fully-overlapped condition (FIG. 4B-2), the second valve window 34B of the valve member 12 starts its overlapping operation with the second valve port opening 33B of the valve housing 11 and its overlapping condition is moved to a partly-overlapped condition as shown in FIG. 4C-2 (the second valve opened condition). As a result, the third fluid passage P3 connected to the radiator R is also opened.

An overlapping area formed between the second valve window 34B and the second valve port opening 33B is gradually increased when the valve member 12 is rotated from the position of FIG. 4B-2 to the position of FIG. 4C-2.

In the second valve opened condition (FIG. 4C-2), although the opening area formed between the first valve window 34A and the first valve port opening 33A is in reverse proportion to the opening area formed between the second valve window 34B and the second valve port opening 33B, each of the first and the second valve windows 34A and 34B of the valve member 12 is concurrently opened to each of the first and the second valve port openings 33A and 33B of the valve housing 11. Accordingly, the first fluid passage P1 is communicated to both of the second fluid passage P2 connected to the oil cooler O and the third fluid passage P3 connected to the radiator R.

During the above operation of the first valve portion 31 shown in FIGS. 4A-2 to 4C-2, the second valve portion 32 remains in its valve closed condition, as shown in FIGS. 4A-1 to 4C-1. In other words, the third valve window 35A of the valve member 12 does not overlap with the third valve port opening 33C of the valve housing 11 in the first operational mode. The fourth fluid passage P4 connected to the heater core H is thereby closed.

As above, a control function for the cooling water, which is fitted to the first operational mode of the cooling system 100, can be realized by rotating the valve member 12 of the rotary valve 10 in the clockwise direction T1.

As explained above, the valve member 12 of the rotary valve 10 is rotated in the anti-clockwise direction T2 in the second operational mode. The first and the second valve portions 31 and 32 are operated as shown in FIG. 5.

Each of FIGS. 5A-1 and 5A-2 shows a valve closed condition for the first valve portion 31 and the second valve portion 32, before the valve member 12 is rotated. Each of FIGS. 5B-1 and 5B-2 shows a third valve opened condition, each of FIGS. 5C-1 and 5C-2 shows a fourth valve opened condition, and each of FIGS. 5D-1 and 5D-2 shows a fifth valve opened condition.

An operation of the first and the second valve portions 31 and 32 for the second operational mode will be explained.

When the valve member 12 is rotated from its valve closed position of FIGS. 5A-1 and 5A-2 in the anti-clockwise direction T2, the third valve window 35A of the valve member 12 starts its overlapping operation with the third valve port opening 33C of the valve housing 11 and its overlapping condition is moved to a fully-overlapped condition as shown in FIG. 5B-1 (the third valve opened condition). During the above operation of the second valve portion 32 (from the valve position of FIG. 5A-1 to the valve position of FIG. 5B-1), the first valve portion 31 maintains its valve closed condition as shown in FIGS. 5A-2 and 5B-2.

Since the third valve window 35A has the elongate hole for the second valve portion 32, the fully-overlapped condition is maintained even after the third valve window 35A reaches its fully-overlapped condition (FIG. 5B-1). Therefore, even when the valve position of the valve member 12 is moved from the third valve opened condition (FIG. 5B-1) to the fourth or the fifth valve opened condition (FIG. 5C-1 or FIG. 5D-1), the second valve portion 32 maintains its fully-overlapped condition between the third valve window 35A and the third valve port opening 33C. As above, the fourth fluid passage P4 connected to the heater core H is continuously fully opened.

During the above operation of the second valve portion 32 shown in FIGS. 5B-1 to 5D-1, the valve position of the valve member 12 for the first valve portion 31 is sequentially moved from the third valve opened condition of FIG. 5B-2 to the fourth and the fifth valve opened conditions of FIGS. 5C-2 and 5D-2. More exactly, in the third valve opened condition of FIG. 5B-2, the second valve window 34B of the valve member 12 starts its overlapping operation with the first valve port opening 33A of the valve housing 11 and its overlapping condition is moved to a fully-overlapped condition as shown in FIG. 5C-2 (the fourth valve opened condition). The valve opened condition of FIG. 5C-2 is equivalent to that of the first valve opened condition of FIG. 4B-2, so that the second fluid passage P2 connected to the oil cooler O is fully opened.

Thereafter, the first valve window 34A of the valve member 12 starts its overlapping operation with the second valve port opening 33B of the valve housing 11 and its overlapping area is increased as the valve member 12 is rotated toward the fifth valve opened condition of FIG. 5D-2. The valve opened condition of FIG. 5D-2 is equivalent to that of the second valve opened condition of FIG. 4C-2, so that the third fluid passage P3 connected to the radiator R is opened in addition to the second fluid passage P2 connected to the oil cooler O.

In the fifth valve opened condition (FIG. 5D-2), although the opening area formed between the first valve window 34A and the second valve port opening 33B is in reverse proportion to the opening area formed between the second valve window 34B and the first valve port opening 33A, each of the first and the second valve windows 34A and 34B of the valve member 12 is concurrently opened to each of the first and the second valve port openings 33A and 33B of the valve housing 11. Accordingly, the first fluid passage P1 is communicated to both of the second fluid passage P2 connected to the oil cooler O and the third fluid passage P3 connected to the radiator R.

As above, a control function for the cooling water, which is fitted to the second operational mode of the cooling system 100, can be realized by rotating the valve member 12 of the rotary valve 10 in the anti-clockwise direction T2.

(Second Characterizing Point)

The following three control conditions are necessary for the rotary valve 10 in order to practically fit the operation of the rotary valve 10 to the above two operational modes.

(1) There should exist a room in an interval of a valve-opening starting position between the valve portions, for which a valve opening-closing timing is closer to each other. The interval of the valve-opening starting position corresponds to a rotational angle of the valve member 12. Hereinafter, the condition for the room in the interval of the valve-opening starting position is also referred to as "a room-level condition".

In other words, since there exist dimensional variations in each of the parts and/or components for the rotary valve 10 due to manufacturing errors and/or dimensional tolerances, it is necessary to have the above room in the intervals of the valve-opening starting position in order to absorb the dimensional variations.

(2) There is a restriction in an order of a valve opening operation, in view of effectively using the cooling water as heat medium to the respective devices (the components O, R, H). Hereinafter, the condition for the order of the valve opening operation will be also referred to as "a valve-opening order condition".

For example, it is desirable to open the third fluid passage P3 connected to the radiator R at the end, because the third fluid passage P3 connected to the radiator R is the fluid passage for cooling down the cooling water.

(3) It is necessary to maintain a sum of flow rates of the cooling water for the oil cooler O and the radiator R at a constant value in view of an arrangement (a layout) of the fluid outlet ports. Hereinafter, the condition for the flow rates is also referred to as "a constant flow-rate condition".

The rotary valve 10 of the present embodiment satisfies the above three control conditions. A mechanism for satisfying the three control conditions will be explained with reference to FIG. 6, which shows valve opening-closing timings as well as valve opening-closing conditions of all of the valve port openings 33A to 33C.

Figure 6:
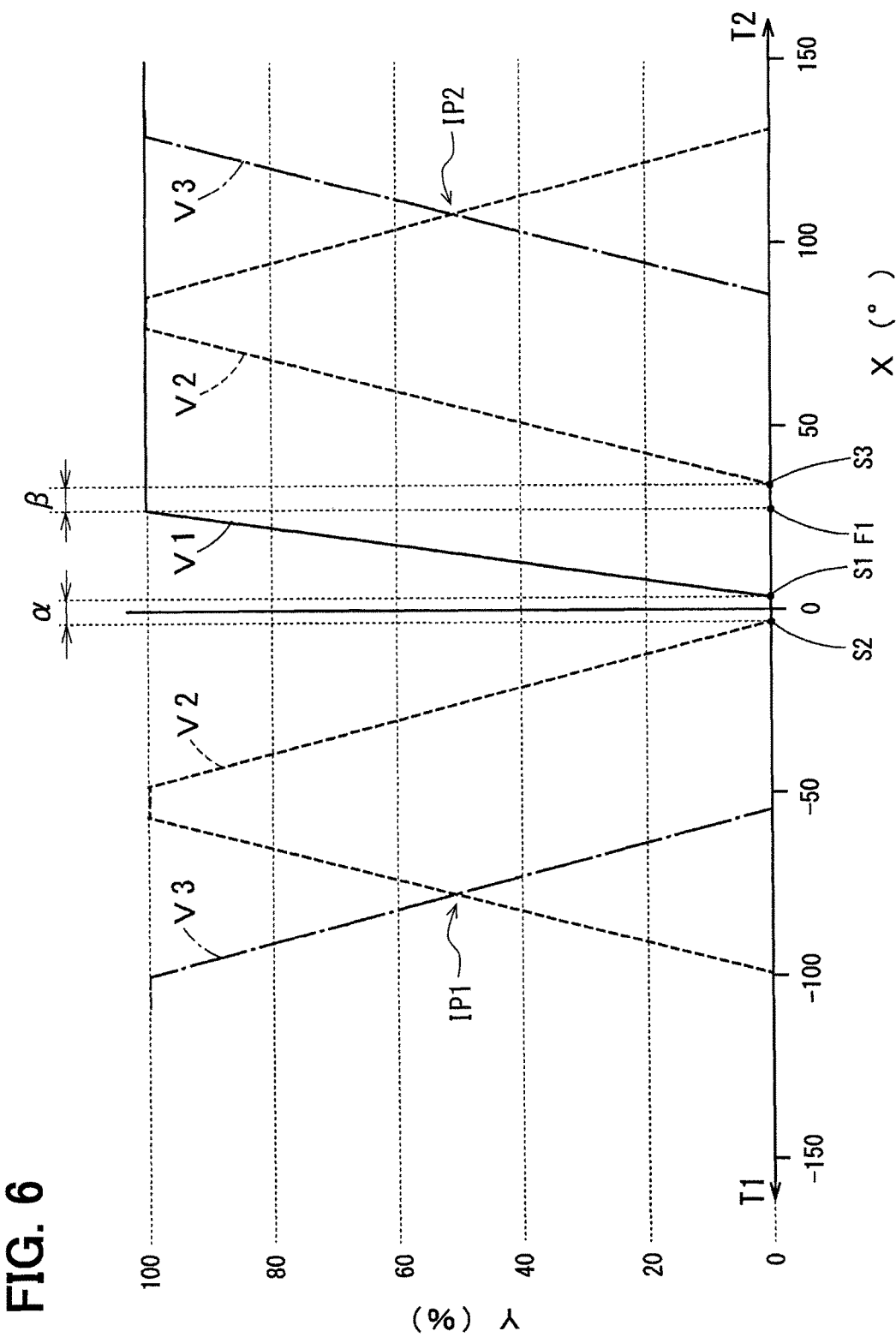
FIG. 6 is a view for showing operations of the rotary type valve, including valve opening and closing timing as well as valve opening and closing condition.

In FIG. 6, a horizontal axis shows a rotational angle "X degrees" of the valve member 12 from its initial position indicated by 0° (zero degree) at a center of the horizontal axis, wherein a minus figure in a left-hand side from the center (0°=zero degree) indicates the rotational angle of the valve member 12 when it is rotated in the clockwise direction T1, while a positive figure in a right-hand side from the center (0°=zero degree) indicates the rotational angle of the valve member 12 when it is rotated in the anti-clockwise direction T2. A vertical axis in FIG. 6 shows a valve opening degree "Y %" of each valve portion, wherein 0% indicates a valve fully-closed condition, while 100% indicates a valve fully-opened condition.

In FIG. 6, a solid line shows a valve opening characteristic V1 for the heater core H, which is realized by the third valve window 35A and the third valve port opening 33C. A dotted line shows a valve opening characteristic V2 for the oil cooler O, which is realized by the first valve window 34A and the first valve port opening 33A in the case of the rotation of the valve member 12 in the clockwise direction T1 or by the second valve window 34B and the first valve port opening 33A in the case of the rotation of the valve member 12 in the anti-clockwise direction T2. A one-dot-chain line shows a valve opening characteristic V3 for the radiator R, which is realized by the second valve window 34B and the second valve port opening 33B in the case of the rotation of the valve member 12 in the clockwise direction T1 or by the first valve window 34A and the second valve port opening 33B in the case of the rotation of the valve member 12 in the anti-clockwise direction T2.

As shown in FIG. 6, the valve opening characteristic V2 for the oil cooler O and the valve opening characteristic V3 for the radiator R are sequentially brought out when the valve member 12 is rotated in the clockwise direction T1, while the valve opening characteristics V1, V2 and V3 are sequentially brought out when the valve member 12 is rotated in the anti-clockwise direction T2.

In addition, a certain interval "α" (the rotational angle α) is set between two points S1 and S2 in order that the points S1 and S2 do not overlap with each other in the circumferential direction, wherein the point S2 corresponds to the valve-opening starting position of the valve opening characteristic V2 for the oil cooler O in the rotational movement of the valve member 12 in the clockwise direction T1 and the point S1 corresponds to the valve-opening starting position of the valve opening characteristic V1 for the heater core H in the rotational movement of the valve member 12 in the anti-clockwise direction T2. In a similar manner, a certain interval "β" (the rotational angle β) is set between two points S3 and F1 in order that the points S3 and F1 do not overlap with each other in the circumferential direction. The point S3 corresponds to the valve-opening starting position of the valve opening characteristic V2 for the oil cooler O, when the valve member 12 is rotated in the anti-clockwise direction T2. The point F1 corresponds to an ending point of a valve-opening movement in the valve opening characteristic V1 for the heater core H, when the valve member 12 is rotated in the anti-clockwise direction T2. As above, the first control condition (that is, the room-level condition) is satisfied.

As explained above, the valve opening characteristics V2 and V3 are sequentially brought out when the valve member 12 is rotated in the clockwise direction T1, while the valve opening characteristics V1, V2 and V3 are sequentially brought out when the valve member 12 is rotated in the anti-clockwise direction T2. In other words, the cooling water sequentially flows to the oil cooler O and the radiator R, when the valve member 12 is rotated in the clockwise direction T1 in the first operational mode. On the other hand, the cooling water sequentially flows to the heater core H, the oil cooler O and the radiator R, when the valve member 12 is rotated in the anti-clockwise direction T2 in the second operational mode. As above, the second control condition (that is, the valve-opening order condition) is satisfied.

In each of the rotational movements of the valve member 12 in the clockwise direction T1 and the anti-clockwise direction T2, the valve opening characteristic V2 for the oil cooler O and the valve opening characteristic V3 for the radiator R intersect with each other at points IP1 and IP2, as indicated in FIG. 6, so that the valve opening degree "Y" of the valve opening characteristic V2 inversely relates to the valve opening degree "Y" of the valve opening characteristic V3. Therefore, the sum of the flow rates of the cooling water to the oil cooler O and the radiator R is maintained at the constant value. As a result, the third control condition (that is, the constant flow-rate condition) is satisfied.

(Third Characterizing Point)

A third characterizing point of the present embodiment relates to shapes of the valve windows and the valve port openings of the valve portion 30, which are a basis for effectively realizing the above first and second characterizing points. More exactly, each of the valve windows and the valve port openings is formed in the rectangular shape in its developed figure, when developed in the rotational direction of the valve member 12.

In the present embodiment, all of the valve windows 34A, 34B and 35A and the valve port openings 33A to 33C are formed in the rectangular shape. As representative examples, the valve windows of the valve member 12 will be explained with reference to FIGS. 3A to 3C.

FIGS. 3B and 3C are comparison examples. In FIG. 3B, a lower-side valve window 34C is formed in an oval shape, while an upper-side valve window 35B is formed in an elongate hole having semi-oval shapes at its horizontal ends. In FIG. 3C, a lower-side valve window 34D is formed in a circular shape, while an upper-side valve window 35O is formed in an elongate hole having semi-circular shapes at its horizontal ends.

According to the present embodiment, as shown in FIG. 3A, each of the lower-side valve windows 34 (34A, 34B) as well as the upper-side valve window 35 (35A) is formed in the rectangular shape, which has right angles at its four corners.

Since the upper-side valve window 35 (the third valve window 35A) is formed as the elongate hole, for which a larger rotational angle (a larger valve opening angle) is necessary, the third valve window 35A is formed in an elongate rectangular shape. On the other hand, since two valve windows of the lower-side valve window 34 (the first stage valve window 34) has a smaller rotational angle (a smaller valve opening angle), each of the first and the second valve windows 34A and 34B of the first stage valve window 34 may be formed in a square shape.

In the second stage valve window 35, a part of the elongate rectangular shape of the third valve window 35A may be formed in a square shape in an area XA, which corresponds to the rotational angle of the first valve portion 31 between the valve fully closed position and the valve fully opened position of the first or the second valve window 34A/34B.

Although not shown in the drawings, since each of the valve port openings 33A, 33B and 33C of the valve housing 11 has the same figure to one another and a smaller valve opening angle, each of them is formed in a square shape, which is the same to those of the first and the second valve windows 34A and 34B.

In FIGS. 3B and 3C, each of the lower-side valve window 34C of the oval shape and the lower-side valve window 34D of the circular shape has an opening area, which is the same to that of the lower-side valve window 34A/34B of the rectangular shape.

In addition, for example, although not shown in FIGS. 3B and 3C, each of the lower-side and the upper-side valve port openings of the valve housing has a rectangular shape, a height of which in the axial direction is respectively equal to or larger than a height of the oval shape of the lower-side valve window 34C, a height of the circular shape of the lower-side valve window 34D, or a height of an elongate hole of the upper-side valve window 35B/35C.

In the present embodiment, the valve windows 34 (34A, 34B) and 35 (35A) of the valve member 12 and the valve port openings 33A to 33C of the valve housing 11, each of which is formed in the rectangular shape, bring out advantageous control functions as explained below with reference to FIG. 7.

Figure 7:
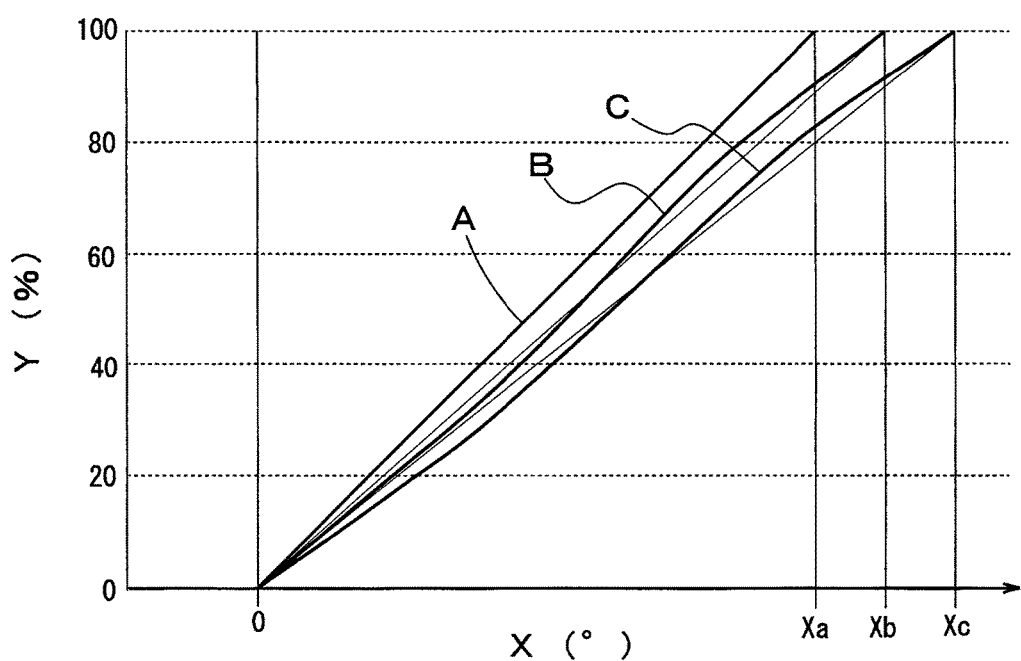
FIG. 7 is a view for explaining operations of the rotary type valves having different fluid port configurations.

FIG. 7 shows valve opening characteristics of the valve portions 30 (31, 32) for obtaining a maximum flow passage area, wherein the developed shapes of the valve windows of the valve member 12 are changed in various manners. In FIG. 7, the valve opening characteristics from the valve fully closed position (Y=0%) to the valve fully opened position (Y=100%) are compared with one another for three different developed shapes of the valve windows. More exactly, a characteristic line A shows the valve opening characteristic in the case that the valve windows 34A, 34B and 35A are formed in the rectangular shapes as shown in FIG. 3A. A characteristic line B shows the valve opening characteristic in the case that the valve window 34C is formed in the oval shape and the elongate hole of the valve window 35B has the half-oval shape at its horizontal ends, as shown in FIG. 3B, wherein each of the oval shapes has a long axis in the axial direction of the valve member 12. A characteristic line C shows the valve opening characteristic in the case that the valve window 34D is formed in the circular shape and the elongate hole of the valve window 35C has the semi-circular shape at its horizontal ends, as shown in FIG. 3C.

In a case of the oval shape or the circular shape, an overlapping area between the lower-side valve window 34C or 34D of the valve member 12 and the lower-side valve port opening of the valve housing is changed depending on the rotational angle X of the valve member 12. An increase rate of a valve opening area (corresponding to the overlapping area) for a unit rotational angle is, therefore, changed from a smaller value to a larger value and then from the larger value to the smaller value. As a result, as shown in FIG. 7, the valve opening degree "Y" is gradually increased in a rotational angle Xb or Xc (wider than Xa), in the case of the valve opening characteristic lines B and C.

On the other hand, in the case of the valve opening characteristic line A, for which the valve windows 34A, 34B and 35A of the valve member 12 are formed in the rectangular shapes, an increase rate of the overlapping area between the lower-side valve window 34A or 34B of the valve member 12 and the lower-side valve port opening 33A or 33B of the valve housing 11 is constantly changed depending on the rotational angle X of the valve member 12. In other words, the valve opening area is linearly increased for the unit rotational angle. Therefore, the valve opening degree "Y" is increased to the valve fully opened condition (Y=100%) in a smaller rotational angle Xa, as shown by the valve opening characteristic line A.

The valve portion 30 of the present embodiment, which has the valve opening characteristic line A, has the following advantages in the control function.

(First Advantage)

A length of each valve window 34A, 34B or 35A of the valve member 12 in the circumferential direction can be made smaller. In other words, the rotational angle Xa necessary for rotating the valve member 12 from its fully closed position (Y=0%) to its fully opened position (Y=100%) can be made smaller. Therefore, it is possible to open or close the multiple valve windows by effectively using one rotation (360°) of the valve member 12 (the cylindrical body portion 16 thereof).

In addition, the smaller rotational angle Xa means that a time necessary for opening or closing the valve window becomes shorter. Therefore, it is possible to increase a control speed of the rotary valve 10.

(Second Advantage)

Since the multiple valve windows can be easily formed in the cylindrical body portion 16 of the valve member 12 in its circumferential direction, it is possible to control the opening/closing of the fluid passages by rotating the valve member 12 of the valve portion 30 either in the clockwise direction T1 or in the anti-clockwise direction T2.

In addition, even when the valve portion 30 is formed in the multi-stage structure, it is possible to satisfy the room-level condition (the first control condition) and to avoid a situation that the valve-opening starting positions of each valve portion 31/32 overlap with each other in the circumferential direction.

(Operational Effects)

The following operational effects can be obtained in the valve device V of the present embodiment.

(E1) As explained above, the third characterizing point relates to the shapes of the valve windows and the valve port openings of the valve portion 30. More exactly, in the first and the second valve portions 31 and 32, each of the valve windows 34A, 34B, 35A and the valve port openings 33A to 33C is formed in the rectangular shape in its developed figure, when each of them is developed in the rotational direction of the valve member 12.

In the valve window and the valve port opening of the rectangular shape, an amount of change of the valve opening area is constant for the unit rotational angle and it is possible to obtain a larger valve opening area with a smaller rotational angle. Therefore, it is possible to control the opening/closing of the different fluid passages P2 to P4 by effectively using one rotation) (360°) of the valve member 12. In other words, a diameter of the valve member 12, that is, a size of the rotary valve 10 in the radial direction, can be made smaller.

(E2) In particular, when each of the four corners of the rectangular shape has 90 degrees, it is possible to maximize the increase rate of the valve opening area for the unit rotational angle even at a timing shortly after starting the valve opening operation. In other words, it is possible to minimize the length of the valve window in the circumferential direction. Furthermore, since it is possible in the square shape to obtain a maximum area with a minimum boundary length, it becomes further possible to minimize the length of the valve window in the circumferential direction when each of the valve windows and the valve port openings is formed in the square shape. For example, the shape of the third valve window 35A is formed in the square shape in the rotational area XA from the valve fully closed position to the valve fully opened position.

(E3) It is possible to easily change the valve-opening starting positions of the first and the second valve portions 31 and 32 without overlapping them with each other in the circumferential direction.

More exactly, the first valve portion 31 of the first stage controls at least two fluid passages P2 and P3, while the second valve portion 32 of the second stage controls the fluid passage P4. The fluid outlet ports 14A to 14C are arranged in a compressed manner in the axial direction of the valve device V. Therefore, the valve device V can control the opening/closing operations of the multiple fluid passages P2 to P4, while an axial dimension of the rotary valve 10 is made smaller.

(E4) Since it is possible to control the opening and closing of the fluid passages P2 to P4 by rotating the valve member 12 of the rotary valve 10 in both of the clockwise direction T1 and the anti-clockwise direction T2, it is further possible to reduce the size of the rotary valve 10 in the radial direction and the axial direction.

(E5) Since the size of the rotary valve 10 can be reduced, as above, the actuator 20 for driving the rotary valve 10 can be correspondingly made smaller in its size and weight.

(E6) Therefore, it is possible to provide the valve device V, which is smaller in its size and weight and which can control the opening and closing of the multiple fluid passages, as a result that the size of the rotary valve 10 in the radial direction as well as in the axial direction can be made smaller.

(Further Embodiments and/or Modifications)

The present disclosure is not limited to the above embodiment but can be further modified in various manners without departing from a spirit of the present disclosure.

(M1) In the above embodiment, all of the valve windows and the valve port openings in the first and the second valve portions are formed in the rectangular shapes. However, the shape of the second stage valve window 35 maybe changed to any other shapes than the rectangular shape, because the second valve portion 32 has one valve window (the third valve window 35A) and the third valve window 35A is formed as the elongate hole.

(M2) In the above embodiment, the rectangular shape is formed as the rectangular shape having the four corners of the right angle. However, a chamfered portion may be formed at each of the four corners.

(M3) The number of the stages of the valve portion 30, the number of the fluid outlet ports at each stage and the arrangement (the layout) of the fluid outlet ports are not limited to those of the above embodiment. The number of the stages, the number of the fluid outlet ports and so on may be changed depending on its use and/or a hydraulic control system.

(M4) In the above embodiment, the valve device V as well as the cooling system 100 is applied to the engine cooling system of the vehicle. The valve device and/or the cooling system of the present disclosure may be applied to any other hydraulic control systems, in which opening and closing operations of multiple fluid passages are controlled by the rotary valve.

What is claimed is:

1. A valve device comprising;
a rotary valve and an actuator connected to the rotary valve for operating a rotation of the rotary valve,
wherein the rotary valve includes:
a valve housing having a valve accommodation portion of a cylindrical shape, a fluid inlet port and multiple fluid outlet ports, each of the fluid outlet ports being formed in the valve housing in a radial direction of the valve accommodation portion and respectively connected to different fluid devices located at an outside of the rotary valve;
a valve member rotatably accommodated in the valve accommodation portion and having a cylindrical body portion for controlling an opening or closing of each of the fluid outlet ports;
an open end portion formed in the cylindrical body portion of the valve member at an axial end of the cylindrical body portion and communicated to the fluid inlet port of the valve housing, so that working fluid is supplied into an inside of the cylindrical body portion of the valve member; and
a first valve portion and a second valve portion formed in the rotary valve and arranged in an axial direction of the valve member, each of the first and the second valve portions being formed as a valve portion for opening or closing a fluid communication between the fluid inlet port and each of the fluid outlet ports, wherein the first valve portion is composed of:
a first valve port opening formed in the valve housing at an inner peripheral wall of the valve accommodation portion, the first valve port opening being formed as an inside open end of a first fluid outlet port of the multiple fluid outlet ports;
a second valve port opening formed in the valve housing at the inner peripheral wall of the valve accommodation portion, the second valve port opening being formed as an inside open end of a second fluid outlet port of the multiple fluid outlet ports;
a first stage valve window formed in the valve member so as to pass through the cylindrical body portion in the radial direction, the first stage valve window respectively opening or closing each of the first valve port opening and the second valve port opening, wherein the second valve portion is composed of:
a third valve port opening formed in the valve housing at the inner peripheral wall of the valve accommodation portion, the third valve port opening being formed as an inside open end of a third fluid outlet port of the multiple fluid outlet ports; and
a second stage valve window formed in the valve member so as to pass through the cylindrical body portion in the radial direction, the second stage valve window opening or closing the third valve port opening, and wherein each of the first valve port opening, the second valve port opening and the first stage valve window of the first valve portion is formed in a rectangular shape in a rotational direction of the valve member.

2. The valve device according to claim 1, wherein
each of the third valve port opening and the second stage valve window of the second valve portion is formed in a rectangular shape in the rotational direction of the valve member.

3. The valve device according to claim 1, wherein
the first stage valve window comprises:
a first valve window for opening or closing each of the first valve port opening and the second valve port opening; and
a second valve window for opening or closing each of the first valve port opening and the second valve port opening,
wherein the first and the second valve windows are arranged in a circumferential direction of the cylindrical body portion and separated from each other in the circumferential direction.

4. The valve device according to claim 3, wherein
the valve member is rotated by the actuator in both directions of a clockwise direction and an anti-clockwise direction, and
a valve-opening starting position of the first valve portion in the rotation of the valve member in the clockwise direction and a valve-opening starting position of the second valve portion in the rotation of the valve member in the anti-clockwise direction are separated from each other in the circumferential direction.

5. A cooling system for an internal combustion engine of an automotive vehicle, in which the valve device according to claim 1 is used, comprising:
a radiator for cooling the working fluid to be supplied to the internal combustion engine;
an oil cooler for heat-exchanging between engine lubricating oil and the working fluid; and a heater core for using the working fluid as a heat source for heating a compartment of the automotive vehicle, wherein the working fluid supplied from the internal combustion engine is introduced to the fluid inlet port, wherein the first fluid outlet port is connected to the oil cooler, wherein the second fluid outlet port is connected to the radiator, and wherein the third fluid outlet port is connected to the heater core.

6. A valve device for a vehicle comprising:

a rotary valve of a multi-stage valve structure having a first valve portion of a first stage and a second valve portion of a second stage, which are arranged in an axial direction of the rotary valve; and an actuator connected to the rotary valve for rotating a valve member of the rotary valve, wherein the rotary valve comprises:

a valve housing having a fluid inlet port, a first fluid outlet port to be connected to an oil cooler for an engine, a second fluid outlet port to be connected to a radiator for the engine and a third fluid outlet port to be connected to a heater core of the vehicle, so that working fluid is supplied into the valve housing and outputted from at least one of the first to the third fluid outlet ports depending on a rotational position of the valve member;

the valve member of a cylindrical shape rotatably accommodated in a valve accommodation portion of the valve housing;

a first valve window, a second valve window and a third valve window, each of which is formed in the valve member so as to pass through a cylindrical body portion of the valve member in a radial direction of the rotary valve;

a first valve port opening formed at an inside of the first fluid outlet port, a second valve port opening formed at an inside of the second fluid outlet port, and a third valve port opening formed at an inside of the third fluid outlet port, wherein the first and the second valve windows and the first and the second valve port openings form the first valve portion, while the third valve window and the third valve port opening form the second valve portion, so that the first valve port opening and the second valve port opening are respectively and operatively opened by the first or the second valve window when the valve member is rotated in either a clockwise direction or an anti-clockwise direction and the third valve port opening is operatively opened by the third valve window when the valve member is rotated in the anti-clockwise direction, and wherein each of the valve windows and the valve port openings of the first valve portion is formed in a rectangular shape.

7. The valve device according to claim 6, wherein the first valve port opening to be connected to the oil cooler is opened by the first valve window and then the second valve port opening to be connected to the radiator is opened by the second valve window, when the valve member is rotated in the clockwise direction, the third valve port opening to be connected to the heater core remains closed, when the valve member is rotated in the clockwise direction, and the third valve port opening is opened by the third valve window, when the valve member is rotated in the anti-clockwise direction, and then the first valve port opening and the second valve port opening are sequentially and respectively opened by the second valve window and the first valve window, when the valve member is rotated in the anti-clockwise direction.

8. The valve device according to claim 7, wherein a valve-opening starting position of the first valve port opening, which is opened by the first valve window when the valve member is rotated in the clockwise direction, is separated in a circumferential direction of the valve member from a valve-opening starting position of the third valve port opening, which is opened by the third valve window when the valve member is rotated in the anti-clockwise direction.

9. The valve device according to claim 7, wherein a valve-opening starting position of the first valve port opening, which is opened by the second valve window when the valve member is rotated in the anti-clockwise direction, is separated in a circumferential direction of the valve member from an end of a valve opening movement of the third valve port opening which is opened by the third valve window, when the valve member is rotated in the anti-clockwise direction.

10. The valve device according to claim 7, wherein the second valve port opening is opened by the second valve window during a period in which an opening condition of the first valve port opening is changed by the first valve window in a direction from its fully opened condition to a valve closed condition, when the valve member is rotated in the clockwise direction, in such a manner that a sum of a flow rate of the working fluid flowing through the second valve port opening and a flow rate of the working fluid flowing through the first valve port opening is maintained at a constant value.

11. The valve device according to claim 7, wherein the second valve port opening is opened by the first valve window during a period in which an opening condition of the first valve port opening is changed by the second valve window in a direction from its fully opened condition to a valve closed condition, when the valve member is rotated in the anti-clockwise direction, in such a manner that a sum of a flow rate of the working fluid flowing through the second valve port opening and a flow rate of the working fluid flowing through the first valve port opening is maintained at a constant value.

* * * * *